Figure 1:
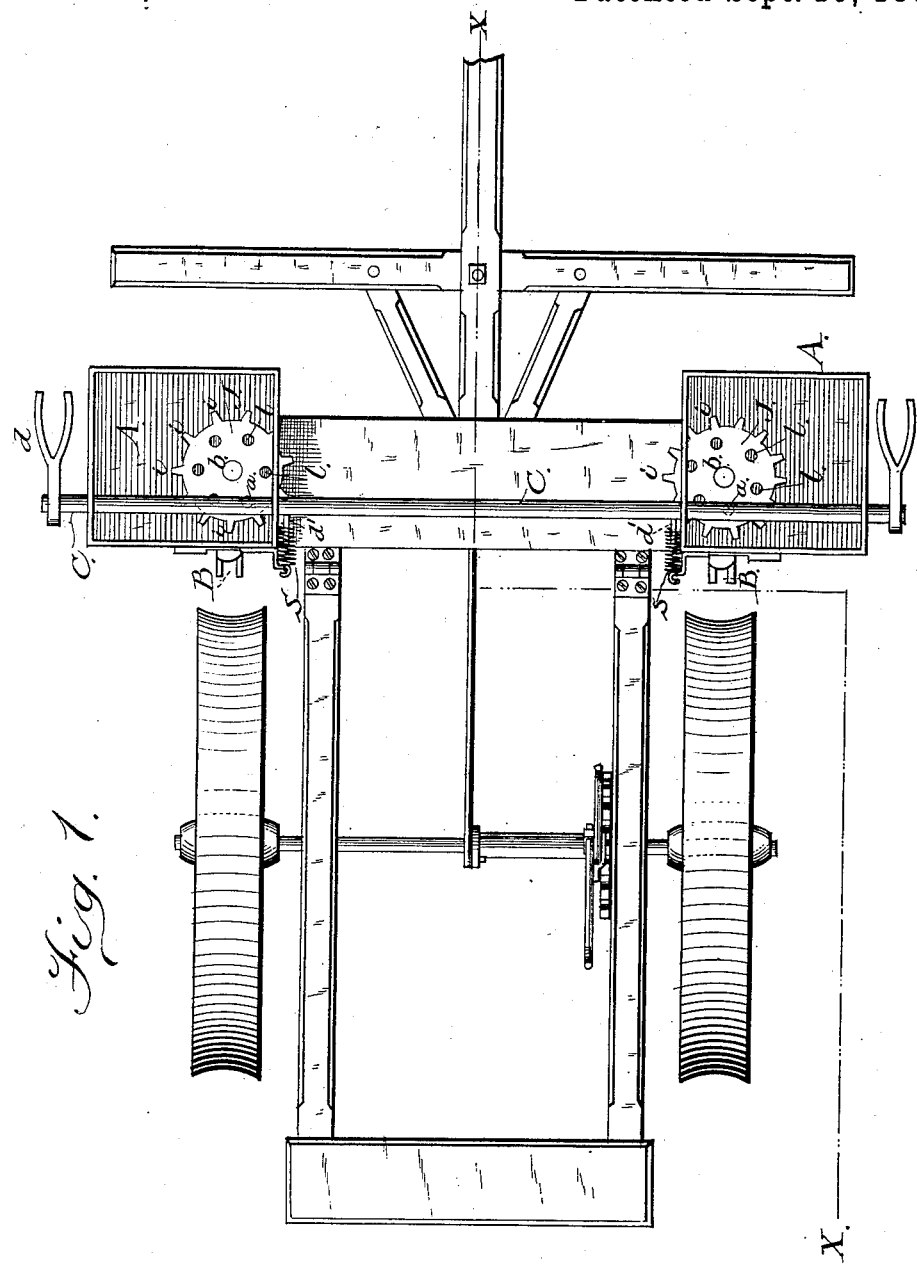

(No Model.) 2 Sheets—Sheet 1.
A. S. & E. HOUCK & A. M. GREENLEE.
CHECK ROW PLANTER.
No. 264,699. Patented Sept. 19, 1882.

Witnesses;
Walter Fowler,
H. B. Applewhaite.

Inventors;
Austin S. Houck
Andrew M. Greenlee
Edwin Houck
per Attys
A. H. Evans & Co.

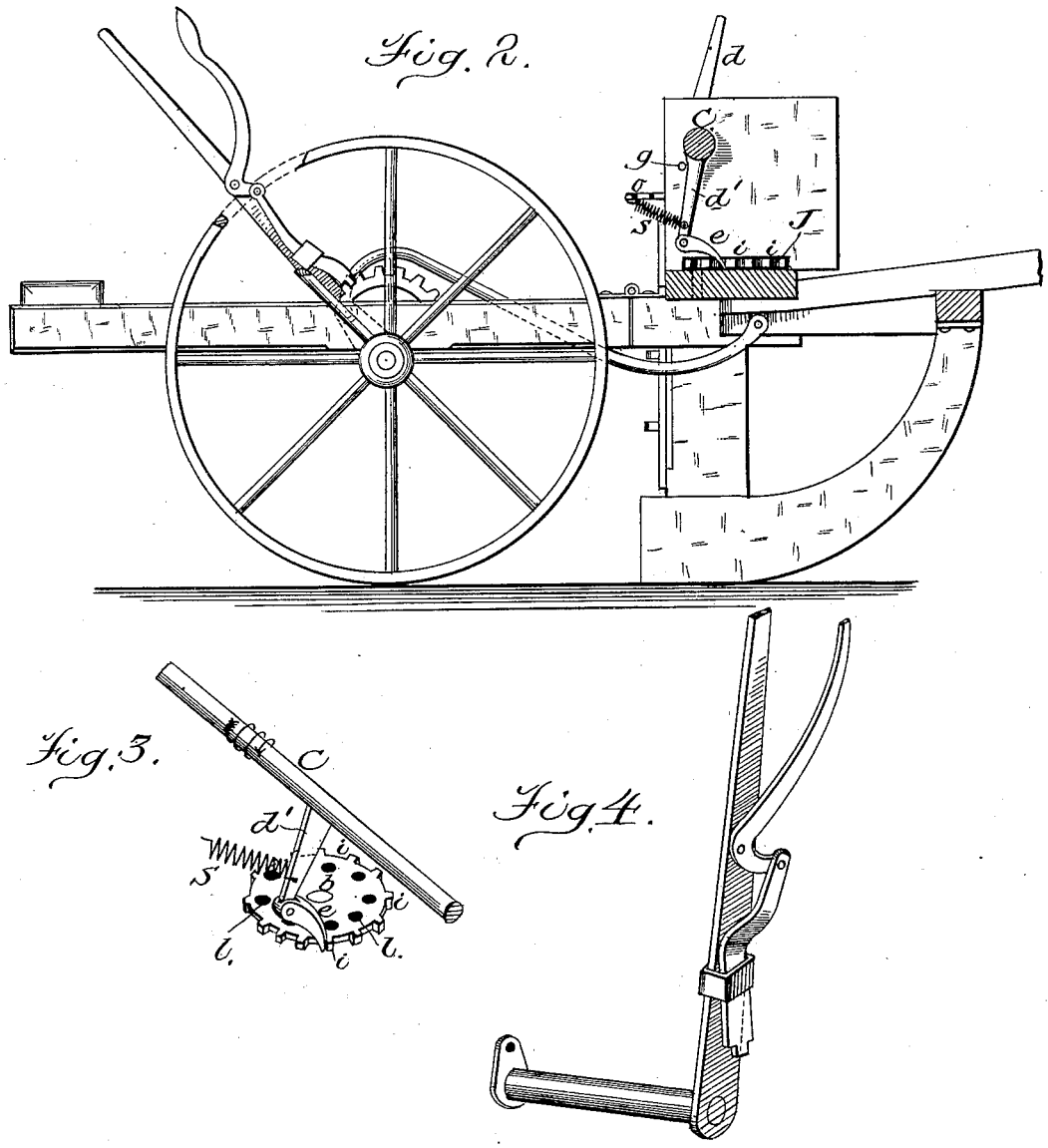

UNITED STATES PATENT OFFICE.

AUSTIN S. HOUCK, EDWIN HOUCK, AND ANDREW M. GREENLEE, OF BEDFORD, IOWA.

CHECK-ROW PLANTER.

SPECIFICATION forming part of Letters Patent No. 264,699, dated September 19, 1882.

Application filed July 14, 1882. (No model.)

*To all whom it may concern:*

Be it known that we, A. S. HOUCK, EDWIN HOUCK, and A. M. GREENLEE, of Bedford, in the county of Taylor and State of Iowa, have invented a new and Improved Check-Row Planter; and we hereby declare the following to be a full, clear, and exact description thereof, reference being had to the accompanying drawings, making part of this specification, in which—

Figure 1 is a plan view of the dropping device. Fig. 2 is a sectional view of the same on line $x$ $x$ of Fig. 1. Figs. 3 and 4 are details to be referred to.

The object of our invention is to provide a seed-dropper adapted to be used with a check-rower; and our invention consists in a rock-shaft passing through the seed-boxes, in combination with a means for retracting said shaft, after it has been vibrated, by the projections on the check-rower to turn the feed-plate.

In order that those skilled in the art may make and use our invention, we will proceed to describe the manner in which we have carried it out.

In the said drawings, A A are the dropper-boxes, and B B the drill-teeth. The bottoms of the boxes A A are provided with openings $a$ $a$, communicating with the interior of the drill-teeth to allow the grain to descend. On the inner sides the casings of boxes A A are cut away, and through the slots thus formed protrude the teeth of a sprocket-wheel which is pivoted at $b$ on the bottom of the said boxes A. Passing across the machine and through the sides of boxes A A, which form bearings for the same, is a rock-shaft, C, on the ends of which are bifurcated arms $d$ $d$, intended to engage the projections on a check-row wire.

The rock-shaft is provided with downwardly-projecting arms $d'$ $d'$, which carry on their lower ends pawls $e$ $e$, which engage with teeth $i$ $i$ of the sprocket-wheel J as the rock-shaft is moved by the check-rower. The sprocket-wheels J have a number of perforations, $l$ $l$, near their edges, and arranged to pass over openings $a$ $a$ in the bottom of the boxes A A, and as the sprocket-wheel is fed around as the perforations $l$ $l$ register with the openings $a$ $a$ a certain amount of grain falls into the drill-teeth to pass to the ground. Springs S S, having one end attached to arms $d'$ $d'$, and the other ends attached to brackets $o$ $o$, serve to retract said arms after the check-rower has required the pawl to feed the sprocket-wheel forward one tooth. Stops $q$ $q$ limit the movement of the arms $d'$ $d'$.

Having thus described our invention, what we claim as new, and desire to secure by Letters Patent, is—

1. In a seeder and planter, a rock-shaft passing through the boxes A A, and retracting-springs S S, in combination with a device adapted to engage the projections on a check-rower and operating the feeding-plate, for the purpose set forth.

2. The boxes A and rock-shaft C, provided with bifurcated arms $d$ $d$ and downwardly-projecting arms $d'$ $d'$, in combination with the revolving perforated sprocket-wheel J and pawl $e$, all constructed, arranged, and operated as described.

AUSTIN S. HOUCK.
EDWIN HOUCK.
ANDREW M. GREENLEE.

Witnesses:
SALEM PRATT,
DANIEL HAGER.